Nov. 22, 1949     J. C. WITT     2,489,211
APPARATUS FOR PRODUCING CEMENT CLINKERS AND THE LIKE
Filed Feb. 10, 1947
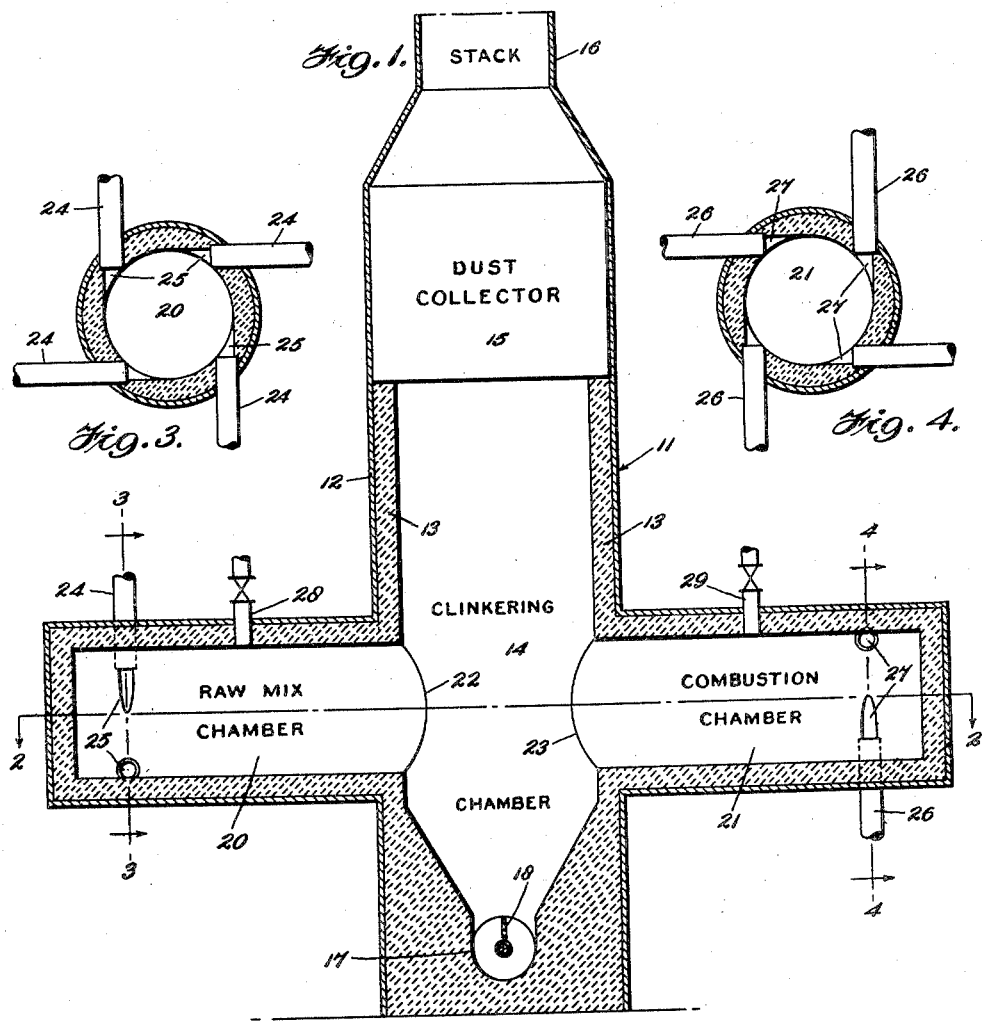
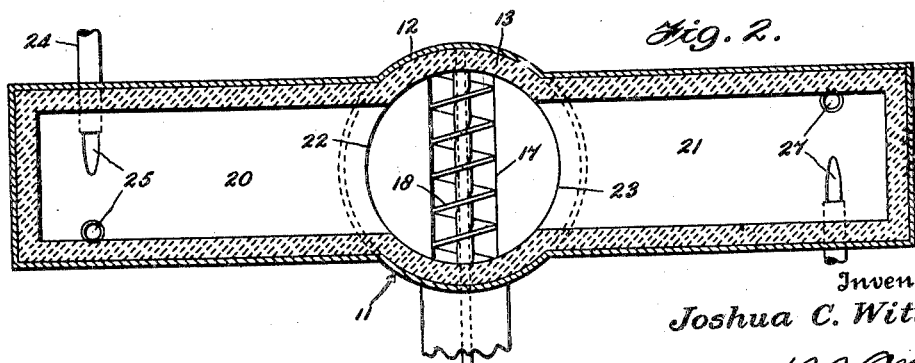
Inventor
Joshua C. Witt, Patented Nov. 22, 1949

2,489,211

UNITED STATES PATENT OFFICE 2,489,211

APPARATUS FOR PRODUCING CEMENT CLINKER AND THE LIKE

Joshua Chitwood Witt, Chicago, Ill.

Application February 10, 1947, Serial No. 727,498

1 Claim. (Cl. 263—53)

The invention relates to the production of hydraulic cement clinker and the like, and has for its principal object the provision of an improved and simplified apparatus for and method of making such materials at substantially reduced costs of installation, operation and maintenance.

When Portland cement was first produced the stationary vertical kiln was already in use in the manufacture of other cementitious materials, and as it was quite adaptable to the making of the new cement, for some forty years all Portland cement clinker was made in such kilns. Then the horizontal rotary kiln was developed and while it was not as efficient as the older vertical kiln so far as fuel consumption was concerned, yet because its use required less labor and resulted in an improved quality of the clinker produced, the rotary kiln gradually supplanted the stationary vertical type, and for many years no Portland cement clinker has been produced in the latter in this country.

Many attempts have been made to increase the thermal efficiency of the rotary kiln, with varying success, one of which has been to increase its length from an original 25 or 30 feet up to 500 feet or more. While this lengthening of the kiln has secured somewhat better fuel economy it still leaves much to be desired in this respect, and the materially increased costs of these longer kilns themselves, as well as of their foundations, housings, power, auxiliary equipment, and installation have resulted in the provision of fewer kilns for a plant of given capacity, with attendant decrease in the flexibility of operation of such plant. In fact, there are some indications that kiln length has reached or passed the optimum, from the standpoint of overall economy.

The present invention provides a method of manufacturing cement clinker of high quality from raw cement-making materials with a thermal efficiency considerably higher than that of the rotary kiln process, which method may be conveniently carried out in a stationary vertical clinkering chamber whereby the initial cost of the apparatus as well as of its installation and maintenance may be materially less than that of similar items in rotary kiln practice, while labor costs for its operation will be at least no greater.

In its broadest aspect the invention comprises continuously bringing separate turbulent masses of finely divided gas-borne raw cement-making materials and burning fuel into intimate contact within a zone at approximately the optimum point in the combustion cycle of the fuel. In the more limited aspect of one specific example thereof, the present method comprises imparting whirling or cyclonic movement to finely divided particles of the cement-making materials in one zone; simultaneously therewith imparting like movement, in the same or in an opposite direction, to a combustible material such as oil, gas or pulverized coal, in a separate zone; igniting the fuel; and directing the two turbulent masses of materials toward one another axially of their cyclonic movements for substantially endwise contact in a zone intermediate the first two. The movements of the masses are so controlled that the particles of the cement-making materials are brought into contact with the burning fuel at substantially the point of maximum heat generation, whereby the calcination and/or sintering of the raw materials may be accomplished with a relatively high efficiency. The product is a clinker in the form of comparatively small nodules, which greatly facilitates the crushing or grinding to the final pulverized form.

For a more detailed explanation of the present process, reference is made to the accompanying drawing forming a part of this specification, in which one form of apparatus suitable for carrying out the process has been illustrated, somewhat diagrammatically, and in which:

Figure 1 is a central vertical sectional view of such apparatus;

Fig. 2 is a horizontal sectional view on the plane indicated by the line 2—2 of Fig. 1, looking down; and Figs. 3 and 4 are cross sectional views through the raw mix and combustion chambers respectively, on the planes indicated by the lines 3—3 and 4—4 of Fig. 1, looking in the directions of the arrows.

Referring to the said drawing more in detail, the apparatus comprises a structure 11 including a shell 12 and a refractory lining 13, providing a vertically disposed clinkering chamber 14, in the upper portion of which may be mounted a dust precipitator or collector 15 of any appropriate construction. Above the dust collector the chamber is surmounted by a stack 16 through which the spent products of combustion may pass; and the lower portion of the chamber converges to a trough 17 in which is mounted a suitable conveyer 18 for discharging the clinkered product.

Extending from opposite sides of the vertical clinkering chamber is a pair of horizontally disposed substantially cylindrical chambers 20 and 21, of which the first may be conveniently designated the "raw mix" chamber, while the second may be termed the "combustion" chamber. These chambers are closed at their outer ends and open into the clinkering chamber 14 through substantially opposed ports 22 and 23. A plurality of conduits 24, for supplying the finely divided cement-making materials to the chamber 20, discharge into the outer portion of such chamber through tangentially arranged ports 25; and in like manner a series of fuel supply pipes 26 discharge into chamber 21 through tangential ports 27. As here shown the ports 25 and 27 are arranged to produce whirling or cyclonic movement of the respective materials in their chambers in opposite directions, but the said ports may be so disposed as to produce movement in the same direction if desired. The sets of pipes or conduits 24 and 26 are each connected to and supplied from a conventional valve controlled main or header; and the chambers 20 and 21 are provided with valve controlled conduits 28 and 29 respectively, for the admission of air, oxygen and/or reclaimed combustion gases, one or more of which may be desirable under various operating conditions.

In practice the apparatus would be provided with such peep holes, man holes, service doors, water jackets, pressure gauges, gas analyzers, pyrometers, etc. as might be necessary or desirable, but since such equipment would be conventional and well known in the art, and is not necessary for an understanding of the invention, it has not been illustrated.

In carrying out the present process in the apparatus above described, the finely divided raw cement-making materials are pressurally introduced into the chamber 20 through the conduits 24 and ports 25, which by reason of their tangential arrangement impart a whirling or cyclonic motion to the materials in such chamber. For such introduction the materials may be entrained or suspended in a gaseous medium, such for example as air, in any well known manner and carried into the chamber by currents or streams thereof.

Simultaneously, combustible material such as oil, gas or pulverized coal is introduced under pressure into the chamber 21 through the conduits 26 and ports 27, which impart cyclonic motion thereto; and such material is ignited, producing a swirling mass of burning fuel in said chamber. Since the only egress from the chambers 20 and 21 is through their ports 22 and 23 the whirling mass in each will be discharged axially of its rotary movement and they will meet head-on in the clinkering chamber 14. The turbulence present in the respective masses, as well as that produced by such meeting, results in a highly efficient and substantially uniform application of heat to the particles of cement-making materials, with the consequent production of a relatively uniform product.

In the combustion cycle of the fuel the temperature rise from the point at which the fuel is ignited to the point at which combustion is completed is quite rapid, while the temperature drop in the burnt gases after completion of combustion is at a lower rate. Thus, the optimum point in the combustion cycle is at or in the immediate neighborhood of the point of completion of combustion; and to enable the contact between the raw mix particles and the burning fuel to take place at approximately this point, the length of the combustion chamber 21 is so chosen and/or the rate of introduction of the fuel into such chamber is so regulated, as by adjustment of the valves controlling the induction conduits 26, that the whirling mass of burning fuel emerges from the port 23 into the clinkering chamber 14 at or immediately before or after the point of maximum temperature is reached. The spent products of combustion pass upwardly through the dust collector 15 to the stack 16, with the said collector precipitating or collecting at least a major portion of any dust carried by such products; and the nodules of cement clinker formed as a result of the contact between the raw material particles and the burning fuel descend to the trough 17, from which they are removed by the conveyer 18. The apparatus will function continuously so long as raw material and fuel are supplied to the respective chambers 20 and 21, and the conveyer 18 operated.

The air necessary for combustion may be supplied in various ways. Usually the primary air is admitted along with the fuel, in the case of powdered coal serving as the carrying medium therefor. Secondary air, if necessary, may be supplied through valve controlled means, such as the conduit 29. Where the raw materials are introduced with air as their carrying medium, such air may constitute a portion or all of the secondary air. In some cases it may be desirable to enrich the mixture in the combustion chamber 21, and this may be done through the introduction of pure oxygen, or of reclaimed combustion gases, through the pipe 29.

Although but one raw mix chamber and one combustion chamber have been illustrated in the embodiment of the invention here shown, obviously two or more sets of such chambers, arranged in batteries and opening into a common clinkering chamber, may be provided if it be desired to increase the capacity of the apparatus.

What is claimed is:

In apparatus for producing hydraulic cement clinker and the like, the combination of means providing a stationary vertically extending clinkering chamber open at its top; means in the upper portion of said chamber for preventing the escape of dust therefrom; means providing separate substantially cylindrical raw mix and combustion chambers extending from opposite sides of said clinkering chamber and having opposed egress ports communicating therewith through which the contents of the raw mix and combustion chambers may be discharged to meet head-on in the clinkering chamber; conduits entering said combustion chamber tangentially thereof in one direction, and said raw mix chamber tangentially thereof in the opposite direction, for introducing combustible and fluid-borne pulverized cement-making materials respectively into such chambers under pressure, whereby cyclonic movements in opposite directions will be imparted to the respective materials; and clinker removing means disposed in the lower portion of the clinkering chamber.

JOSHUA CHITWOOD WITT.

REFERENCES CITED

The following references are of record in the file of this patent:

UNITED STATES PATENTS

| Number | Name | Date |
|---|---|---|
| 1,586,318 | Mabee | May 25, 1926 |

FOREIGN PATENTS

| Number | Country | Date |
|---|---|---|
| 457,957 | Great Britain | Dec. 9, 1936 |